(12) United States Patent　　(10) Patent No.: US 12,664,106 B2
Liu et al.　　(45) Date of Patent: Jun. 23, 2026

(54) COMPUTING SYSTEM, METHOD, AND APPARATUS, AND ACCELERATION DEVICE

(71) Applicant: Huawei Technologies Co., Ltd., Shenzhen (CN)

(72) Inventors: Haocheng Liu, Hangzhou (CN); Qi Zhu, Hangzhou (CN); Baolong Cui, Hangzhou (CN); Haijiang Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 21 days.

(21) Appl. No.: 18/770,092

(22) Filed: Jul. 11, 2024

(65) Prior Publication Data

US 2024/0370385 A1　　Nov. 7, 2024

Related U.S. Application Data

(63) Continuation of application No. PCT/CN2023/071094, filed on Jan. 6, 2023.

(30) Foreign Application Priority Data

Jan. 12, 2022　(CN) .......................... 202210032978.0

(51) Int. Cl.
　　*G06F 13/16*　　(2006.01)
(52) U.S. Cl.
　　CPC ................................ *G06F 13/1668* (2013.01)
(58) Field of Classification Search
　　None
　　See application file for complete search history.

(56) References Cited

U.S. PATENT DOCUMENTS

| | | | | |
|---|---|---|---|---|
| 10,007,464 | B1 * | 6/2018 | Blinzer | G06F 3/061 |
| 2010/0191909 | A1 * | 7/2010 | Archer | G06F 12/1072 |
| | | | | 711/E12.017 |
| 2011/0072234 | A1 * | 3/2011 | Chinya | G06F 12/1036 |
| | | | | 711/E12.001 |
| 2017/0123690 | A1 * | 5/2017 | Albot | G06F 12/08 |
| 2019/0005176 | A1 * | 1/2019 | Illikkal | G06F 21/76 |
| 2020/0117600 | A1 * | 4/2020 | Chirca | G06F 13/1663 |
| 2020/0134208 | A1 * | 4/2020 | Pappachan | G06F 12/1441 |
| 2021/0149680 | A1 | 5/2021 | Hughes et al. | |
| 2021/0192246 | A1 * | 6/2021 | Yang | G06V 10/94 |

FOREIGN PATENT DOCUMENTS

CN　　109547531　A　　3/2019

* cited by examiner

*Primary Examiner* — Michael Sun
(74) *Attorney, Agent, or Firm* — Conley Rose, P.C.

(57)　　ABSTRACT

A computing system includes a host device and an acceleration device. The host device is in a communication connection with the acceleration device. The host device is configured to send invocation information to the acceleration device. The invocation information indicates a storage address of the first data. The acceleration device is configured to receive the invocation information from the host device, obtain the first data from a memory based on the storage address, and perform the to-be-processed task based on the first data to obtain a processing result. The host device notifies the acceleration device of the storage address, and the acceleration device directly obtains the data from the memory based on the storage address such that the host device is prevented from obtaining the data from the memory.

20 Claims, 8 Drawing Sheets

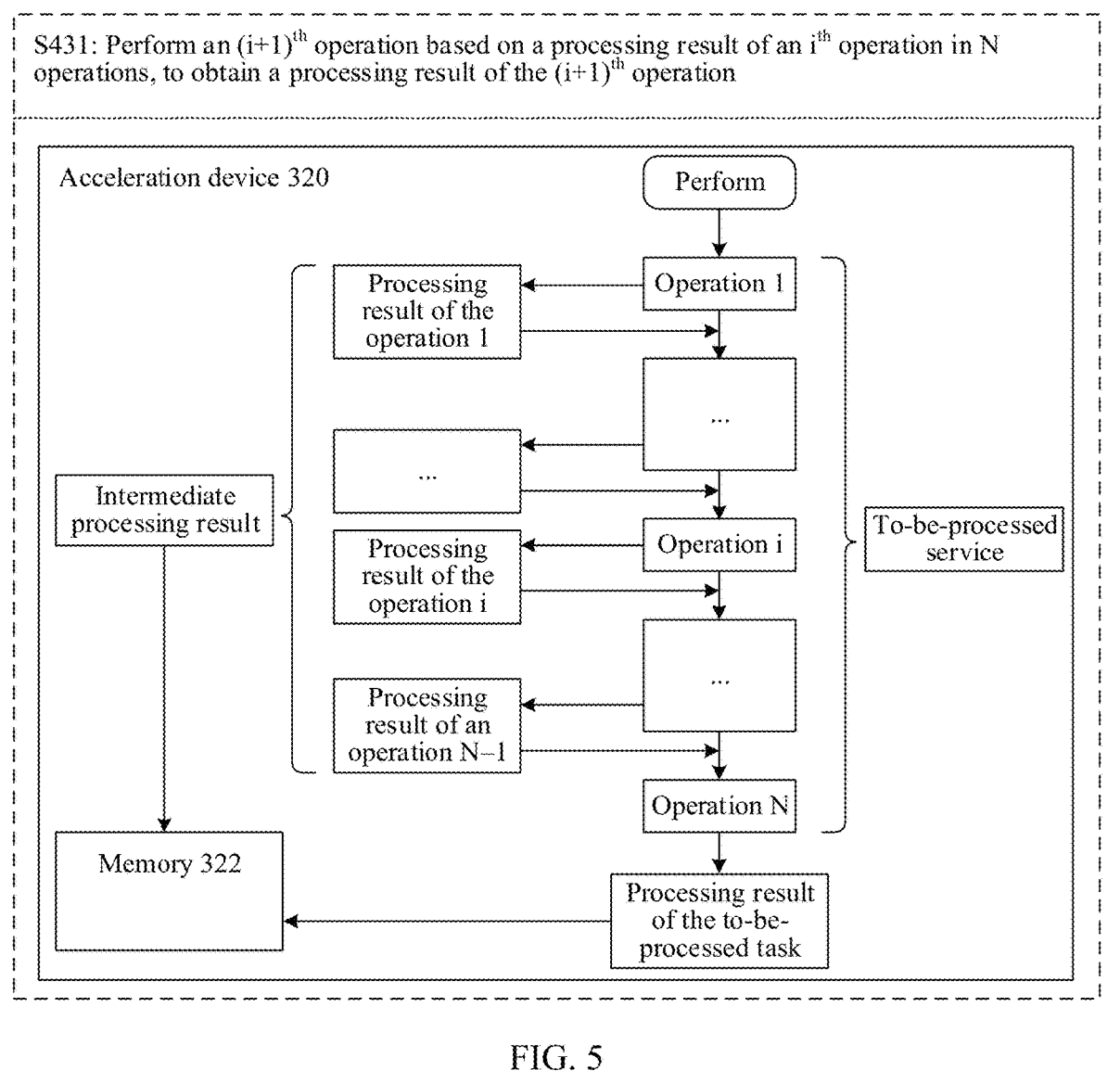

S431: Perform an (i+1)$^{th}$ operation based on a processing result of an i$^{th}$ operation in N operations, to obtain a processing result of the (i+1)$^{th}$ operation Acceleration device 320

Perform

Processing result of the operation 1 ← Operation 1

...

...

Processing result of the operation i ← Operation i

...

Processing result of an operation N−1

Intermediate processing result

Operation N

To-be-processed service

Memory 322

Processing result of the to-be-processed task

FIG. 5

COMPUTING SYSTEM, METHOD, AND APPARATUS, AND ACCELERATION DEVICE

CROSS-REFERENCE TO RELATED APPLICATIONS

This is a continuation of International Patent Application No. PCT/CN2023/071094 filed on Jan. 6, 2023, which claims priority to Chinese Patent Application No. 202210032978.0 filed on Jan. 12, 2022. The disclosures of the aforementioned applications are hereby incorporated by reference in their entireties.

TECHNICAL FIELD

This application relates to the computing field, and in particular, to a computing system, method, and apparatus, and an acceleration device.

BACKGROUND

A heterogeneous computing technology means that a system including a plurality of computing devices is used for computing, and the plurality of computing devices have different instruction sets and architectures. The heterogeneous computing technology becomes a focus of current research because the heterogeneous computing technology can obtain a high-performance computing capability economically and effectively, enable rich computing resources, and improve end-to-end service performance.

Usually, when a computing device performs acceleration processing on a to-be-processed task based on the heterogeneous computing technology, the computing device usually sends data required by the to-be-processed task to another computing device that communicates with the computing device, and the other computing device processes the to-be-processed task. The computing device that sends the data required by the to-be-processed task may be considered as a host device. The computing device that processes the to-be-processed task may be considered as an acceleration device.

However, the data required by the to-be-processed task is stored in a storage device that communicates with the host device. As a result, the data needs to be transmitted for a plurality of times from the storage device to the host device to the acceleration device, and consequently a data transmission amount in a heterogeneous computing process is large. Therefore, how to reduce the data transmission amount in the heterogeneous computing process is an urgent problem to be resolved currently.

SUMMARY

Embodiments of this application provide a computing system, method, and apparatus, and an acceleration device to resolve a problem of a large data transmission amount in a heterogeneous computing process.

To achieve the foregoing objective, this application uses the following technical solutions.

According to a first aspect, a computing system is provided. The computing system includes a host device and an acceleration device. The host device is in a communication connection with the acceleration device, the acceleration device is coupled to a memory, and the memory stores first data required by a to-be-processed service. The host device is configured to send invocation information to the acceleration device, where the invocation information indicates a storage address of the first data. The acceleration device is configured to receive the invocation information sent by the host device, and obtain the first data from the memory based on the storage address. The acceleration device is further configured to perform the to-be-processed task based on the first data to obtain a processing result.

In the computing system in the first aspect, the memory that stores the first data required by the to-be-processed service is coupled to the acceleration device. The acceleration device may obtain the first data from the memory based on the invocation information, and perform the to-be-processed task based on the first data. In other words, the host device notifies the acceleration device of the storage address such that the acceleration device directly obtains the data from the memory based on the storage address and performs processing. This prevents the host device from obtaining the data from the memory and then transmitting the data to the acceleration device. In this way, a data transmission amount in the computing system can be reduced, and a problem of a large data transmission amount in a heterogeneous computing process may be resolved.

In an optional implementation, the to-be-processed service includes N consecutive operations, and N is an integer greater than 1. The acceleration device is further configured to perform an $(i+1)^{th}$ operation based on a processing result of an $i^{th}$ operation in the N operations, to obtain a processing result of the $(i+1)^{th}$ operation. i is an integer, and $1 \le i \le N-1$. A processing result of an $N^{th}$ operation is the processing result. In this way, intermediate processing results of a plurality of operations in the to-be-processed service may not be repeatedly transmitted between the host device and the acceleration device to reduce the data transmission amount and improve computing efficiency.

In another optional implementation, the processing result of the $i^{th}$ operation is stored in the memory or the acceleration device. In this way, when performing the $(i+1)^{th}$ operation, the acceleration device may quickly read the processing result of the $i^{th}$ operation to improve the computing efficiency.

In another optional implementation, the host device is further configured to obtain proxy information, and generate the invocation information based on the proxy information. The proxy information includes a virtual storage address of the first data. In other words, the acceleration device may be invoked, by using the virtual storage address of the first data, to perform the to-be-processed task such as to reduce the data transmission amount and implementation difficulty.

In another optional implementation, the proxy information is stored in the host device. In this way, when the host device needs to determine the invocation information, the host device may quickly read the proxy information to determine the invocation information such as to improve invocation efficiency.

In another optional implementation, the first data is stored in a memory object, and the memory object is storage space of a segment of physical addresses provided by the memory.

In another optional implementation, the acceleration device is further configured to send the virtual storage address of the first data to the host device. Correspondingly, the host device is further configured to receive the virtual storage address that is of the first data and that is sent by the acceleration device. In this way, the host device may determine the proxy information based on the virtual storage address of the first data.

According to a second aspect, a computing method is provided. The method is performed by an acceleration device. The acceleration device is in a communication connection with a host device, the acceleration device is coupled to a memory, and the memory stores first data required by a to-be-processed service. The computing method includes receiving invocation information sent by the host device, where the invocation information indicates a storage address of the first data; obtaining the first data from the memory based on the storage address; and performing the to-be-processed task based on the first data to obtain a processing result.

In another optional implementation, the to-be-processed service includes N consecutive operations, and N is an integer greater than 1. The performing the to-be-processed task based on the first data to obtain a processing result includes performing an $(i+1)^{th}$ operation based on a processing result of an $i^{th}$ operation in the N operations to obtain a processing result of the $(i+1)^{th}$ operation, where i is an integer, and $1 \le i \le N-1$; and a processing result of an $N^{th}$ operation is the processing result.

In another optional implementation, the processing result of the $i^{th}$ operation is stored in the memory or the acceleration device.

In another optional implementation, the first data is stored in a memory object, and the memory object is storage space of a segment of physical addresses provided by the memory.

In another optional implementation, the method in the second aspect further includes sending a virtual storage address of the first data to the host device.

It should be noted that, for beneficial effects of the computing method in the second aspect, refer to the descriptions in any one of the first aspect. Details are not described herein again.

According to a third aspect, a computing method is provided. The method is performed by a host device. The host device is in a communication connection with the acceleration device, the acceleration device is coupled to a memory, and the memory stores first data required by a to-be-processed service. The method includes sending invocation information to the acceleration device, where the invocation information indicates a storage address of the first data.

In another optional implementation, the to-be-processed service includes N consecutive operations, and N is an integer greater than 1. That the to-be-processed task is performed based on first data to obtain a processing result includes performing an $(i+1)^{th}$ operation based on a processing result of an $i^{th}$ operation in the N operations to obtain a processing result of the $(i+1)^{th}$ operation, where i is an integer, and $1 \le i \le N-1$; and a processing result of the $N^{th}$ operation is the processing result.

In another optional implementation, the processing result of the $i^{th}$ operation is stored in the memory or the acceleration device.

In another optional implementation, the method described in the third aspect further includes obtaining proxy information, where the proxy information includes a virtual storage address of the first data; and generating the invocation information based on the proxy information.

In another optional implementation, the proxy information is stored in the host device.

In another optional implementation, the first data is stored in a memory object, and the memory object is storage space of a segment of physical addresses provided by the memory.

In another optional implementation, the method according to the third aspect further includes receiving the virtual storage address that is of the first data and that is sent by the acceleration device.

It should be noted that, for beneficial effects of the computing method in the third aspect, refer to the descriptions in any one of the second aspect. Details are not described herein again.

According to a fourth aspect, this application provides an acceleration device. The acceleration device includes a memory and at least one processor. The memory is configured to store a group of computer instructions. When executing the group of computer instructions, the processor is configured to implement operation steps of the method in any one of the second aspect or the possible implementations of the second aspect.

According to a fifth aspect, this application provides a host device. The host device includes a memory and at least one processor. The memory is configured to store a group of computer instructions. When executing the group of computer instructions, the processor is configured to implement operation steps of the method in any one of the third aspect or the possible implementations of the third aspect.

According to a sixth aspect, this application provides a computer-readable storage medium. The storage medium stores a computer program or instructions. When the computer program or the instructions are executed, operation steps of the methods in the foregoing aspects or the possible implementations of the foregoing aspects is implemented.

According to a seventh aspect, this application provides a computer program product. The computer program product includes instructions. When the computer program product runs on a management node or a processor, the management node or the processor executes the instructions, to implement operation steps of the methods in any one of the foregoing aspects or the possible implementations of the foregoing aspects.

According to an eighth aspect, this application provides a chip including a memory and a processor. The memory is configured to store computer instructions. The processor is configured to invoke the computer instructions from the memory and run the computer instructions, to implement operation steps of the methods in any one of the foregoing aspects or the possible implementations of the foregoing aspects.

In this application, based on the implementations according to the foregoing aspects, the implementations may be further combined to provide more implementations.

BRIEF DESCRIPTION OF DRAWINGS

FIG. 5 is a detailed schematic flowchart of S430 according to an embodiment of this application;

DESCRIPTION OF EMBODIMENTS

Figure 1:
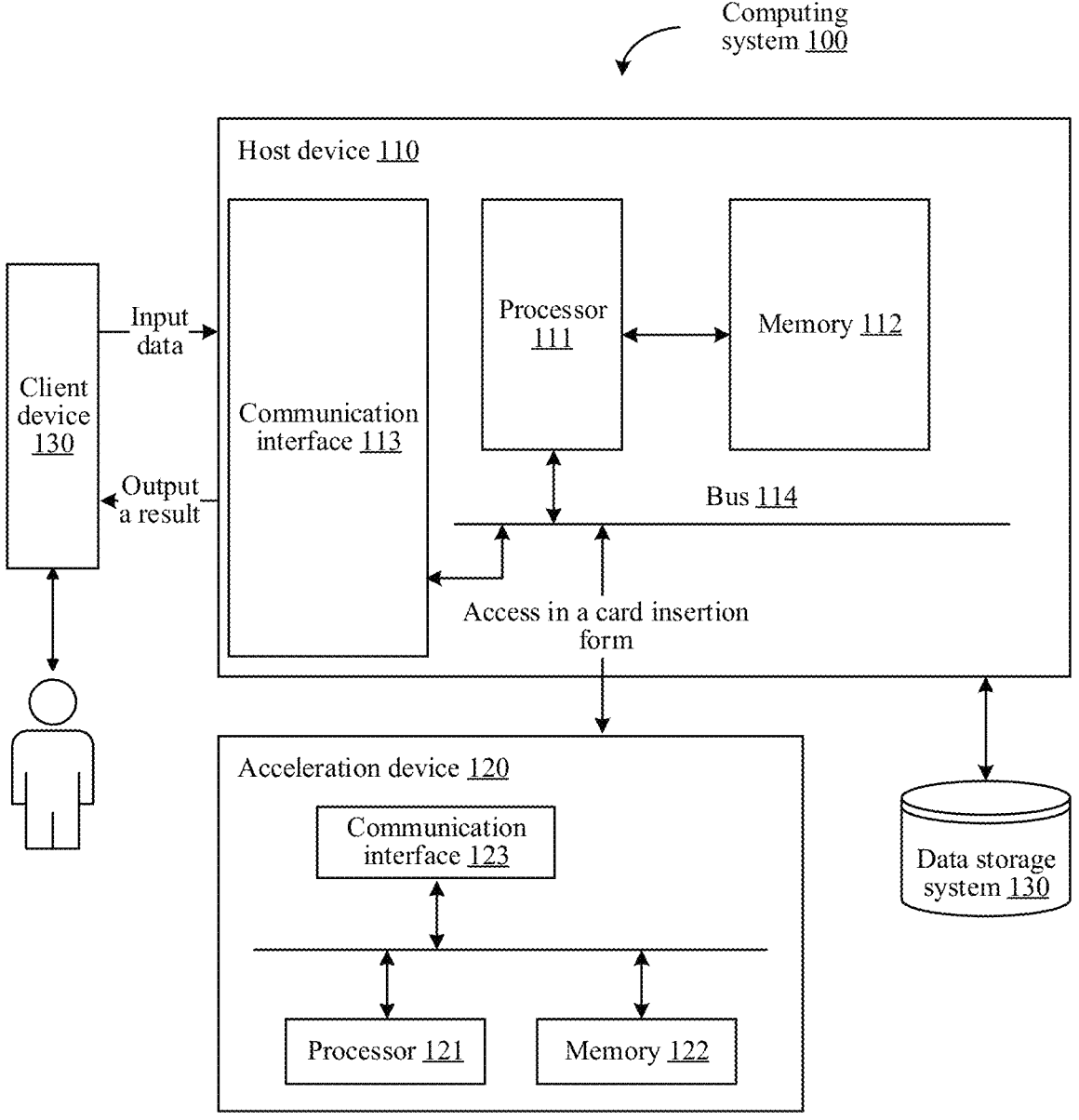
FIG. 1 is a schematic diagram 1 of an architecture of a computing system according to an embodiment of this application.

For clear and brief description of the following embodiments, brief descriptions of technical terms that may be involved are first provided.

1. Near-data computing means that a computing and processing action of data is orchestrated on a computing device that is closest to a storage location of the data. A distance between a storage location of data and a computing device may be defined as a sum of time for transmitting the data to the computing device and time for processing the data by the computing device. In other words, a computing device that is closest to a storage location of data may be a computing device that obtains and processes the data fastest in a plurality of computing devices.

By using a technology of the near-data computing, unnecessary data copies may be significantly reduced, and data computing and processing efficiency of data may be improved.

2. A memory object in embodiments of this application may be space for storing addresses of a group of data. In embodiments of this application, the memory object may also be referred to as a real object, a proxied object, or the like.

In embodiments of this application, the memory object may store a resource object, a persistent object, a connection object, or the like. This is not limited herein. The resource object may refer to a file handle of a read/write storage entity. The persistent object may refer to two consecutive operations, and the two operations need to process at least a same group of data. The connection object may refer to a network connection operation or the like.

3. A proxy object in embodiments of this application may be an object associated with a memory object, and may control an action of access and service of the memory object.

4. A heterogeneous proxy object in embodiments of this application may mean that a memory object and a proxy object belong to different computing device vendors. For example, the proxy object is located in a host device, and the memory object is located in an acceleration device.

5. Proxy in this embodiment of this application may mean that proxy is performed on a memory object through programming to control an action of access and service of the memory object. For example, a proxy object of the memory object may be generated through programming, and the action of access and service of the memory object may be controlled by using the proxy object.

6. Serialization is a process of converting an object into a sequence form that can be transmitted.

7. A proxy class is a set of proxy objects with common attributes and behavior. The proxy class is also a template of a proxy object and can generate the proxy object. A delegate class is a set of proxied objects with common attributes and behavior. The delegate class is also a template of a proxied object and can generate the proxied object. The proxy class can preprocess a message for the delegate class, filter and forward the message, and perform subsequent processing after the message is executed by the delegate class. The proxy class does not implement a specific service. Instead, the proxy class uses the delegate class to complete the service and encapsulate an execution result.

The following describes the implementations of embodiments of this application in detail with reference to the accompanying drawings.

FIG. 1 is a schematic diagram 1 of an architecture of a computing system according to an embodiment of this application. Refer to FIG. 1. A computing system 100 includes a host device 110 and an acceleration device 120. The host device 110 is in a communication connection with the acceleration device 120.

The following separately describes the host device 110 and the acceleration device 120 with reference to the accompanying drawings.

The host device 110 is a computing device. For example, the host device 110 may be a server, a personal computer, a mobile phone, a tablet computer, an intelligent vehicle, or another device. This is not limited herein. The host device 110 may include a processor 111 and a communication interface 113. The processor 111 and the communication interface 113 are coupled to each other.

Optionally, the host device 110 further includes a memory 112. The processor 111, the memory 112, and the communication interface 113 are coupled to each other. A specific implementation in which the processor 111, the memory 112, and the communication interface 113 are coupled to each other is not limited in this embodiment of this application. In FIG. 1, that the processor 111, the memory 112, and the communication interface 113 are connected by using a bus 114 is used as an example. The bus 114 is represented by a bold line in FIG. 1. A connection manner between other components is merely described as an example, and is not limited thereto. The bus may be classified into an address bus, a data bus, a control bus, and the like. For ease of representation, only one bold line is used to represent the bus in FIG. 1, but this does not mean that there is only one bus or only one type of bus.

The communication interface 113 is configured to communicate with another device or another communication network. The communication interface 113 may be a transceiver or an input/output (I/O) interface. For example, the communication interface 113 is an I/O interface. The I/O interface may be configured to communicate with a device located outside the host device 110. For example, the device outside inputs data into the host device 110 through the I/O interface. After processing the input data, the host device 110 may send, to the device outside through the I/O interface, an output result obtained by processing the data.

The processor 111 is a computing core and a control core of the host device 110, and may be a central processing unit (CPU), or may be another specific integrated circuit. The processor 111 may alternatively be another general purpose processor, a digital signal processor (DSP), an application-specific integrated circuit (ASIC), a field-programmable gate array (FPGA) or another programmable logic device, a discrete gate or a transistor logic device, a discrete hardware component, or the like. During actual application, the host device 110 may alternatively include a plurality of processors. The processor 111 may include one or more processor cores. An operating system and another software program are installed in the processor 111, so that the processor 111 can implement access to the memory 112 and various Peripheral Component Interconnect Express (PCIe) devices. The processor 111 may be connected to the memory 112 by using a double data rate (DDR) bus or another type of bus.

The memory 112 is a main memory of the host device 110. The memory 112 is usually configured to store various software that is running in the operating system, instructions executed by the processor 111, input data required by the processor 111 to run the instructions, data generated after the processor 111 runs the instructions, or the like. To improve an access speed of the processor 111, the memory 112 needs to have an advantage of a high access speed. In a computer device, a dynamic random-access memory (DRAM) is usually used as the memory 112. In addition to the DRAM, the memory 112 may alternatively be another RAM, for example, a static random-access memory (SRAM). In addition, the memory 112 may alternatively be a read-only memory (ROM). For example, the read-only memory may be a programmable read-only memory (PROM), an erasable programmable read-only memory (EPROM), or the like. A quantity and types of the memories 112 are not limited in this embodiment.

Optionally, to store data in a persistent manner, a data storage system 130 may be further disposed in the computing system 100. The data storage system 130 may be located outside the host device 110 (as shown in FIG. 1), and exchange data with the host device 110 by using a network. Optionally, the data storage system 130 may alternatively be located inside the host, and exchange data with the processor 111 by using the PCIe bus 114. In this case, the data storage system 130 is represented as a hard disk drive.

The acceleration device 120 is a computing device. For example, the acceleration device 120 may be a server, a personal computer, a mobile phone, a tablet computer, an intelligent vehicle, or another device. This is not limited herein. The acceleration device 120 may include a processor 121 and a communication interface 123. The processor 121 and the communication interface 123 are coupled to each other.

The acceleration device 120 further includes a memory 122. The processor 121, the memory 122, and the communication interface 123 are coupled to each other. During actual application, the memory 122 may be located inside the acceleration device 120 (as shown in FIG. 1), and exchange data with the processor 121 by using a bus. In this case, the memory 122 is represented as a hard disk drive. Alternatively, the memory 122 may be located outside the acceleration device 120, and exchange data with the acceleration device 120 by using a network.

The acceleration device 120 may be configured to perform a to-be-processed task, for example, perform matrix calculation, graphics operation, network data exchange, and disk read/write. The acceleration device 120 may be implemented by one or more processors. The processor may include any one of a CPU, a graphics processing unit (GPU), a neural-network processing unit (NPU), a tensor processing unit (TPU), an FPGA, and an ASIC. The GPU is also referred to as a display core, a visual processor, and a display chip. The GPU is a microprocessor that specially performs an image operation on a personal computer, a workstation, a game console, and some mobile devices (such as a tablet computer and a smartphone). The NPU simulates human neurons and synapses at a circuit layer, and directly processes massive neurons and synapses based on a deep learning instruction set. One instruction is responsible for processing a group of neurons. The ASIC is suitable for a single-purpose integrated circuit product.

The processor 121, the memory 122, and the communication interface 123 are similar to the processor 111, the memory 112, and the communication interface 113. For more detailed descriptions of the processor 121, the memory 122, and the communication interface 123, refer to the descriptions of the processor 111, the memory 112, and the communication interface 113. Details are not described herein again.

It should be noted that the memory 122 may be a non-volatile memory (NVM), for example, a ROM, a flash memory, or a solid-state drive (SSD). In this way, the memory 122 may be configured to store large amount of data, for example, data required by the to-be-processed service. However, in an existing acceleration device, a buffer is usually disposed in the acceleration device, and only a small amount of data can be temporarily stored. The data cannot be stored when the device stops working. Therefore, the existing acceleration device cannot store the data required by the to-be-processed service. However, the acceleration device 120 provided in this embodiment of this application may store the data required by the to-be-processed service by using the memory 122.

In a first possible example, as shown in FIG. 1, the acceleration device 120 may be inserted into a card slot on a mainboard of the host device 110, and exchange data with the processor 111 by using the bus 114. In this case, the bus 114 may be a PCIe bus, or may be a bus of a Compute Express Link (CXL), a Universal Serial Bus (USB) protocol, or another protocol, to support data transmission between the acceleration device 120 and the host device 110.

Figure 2:
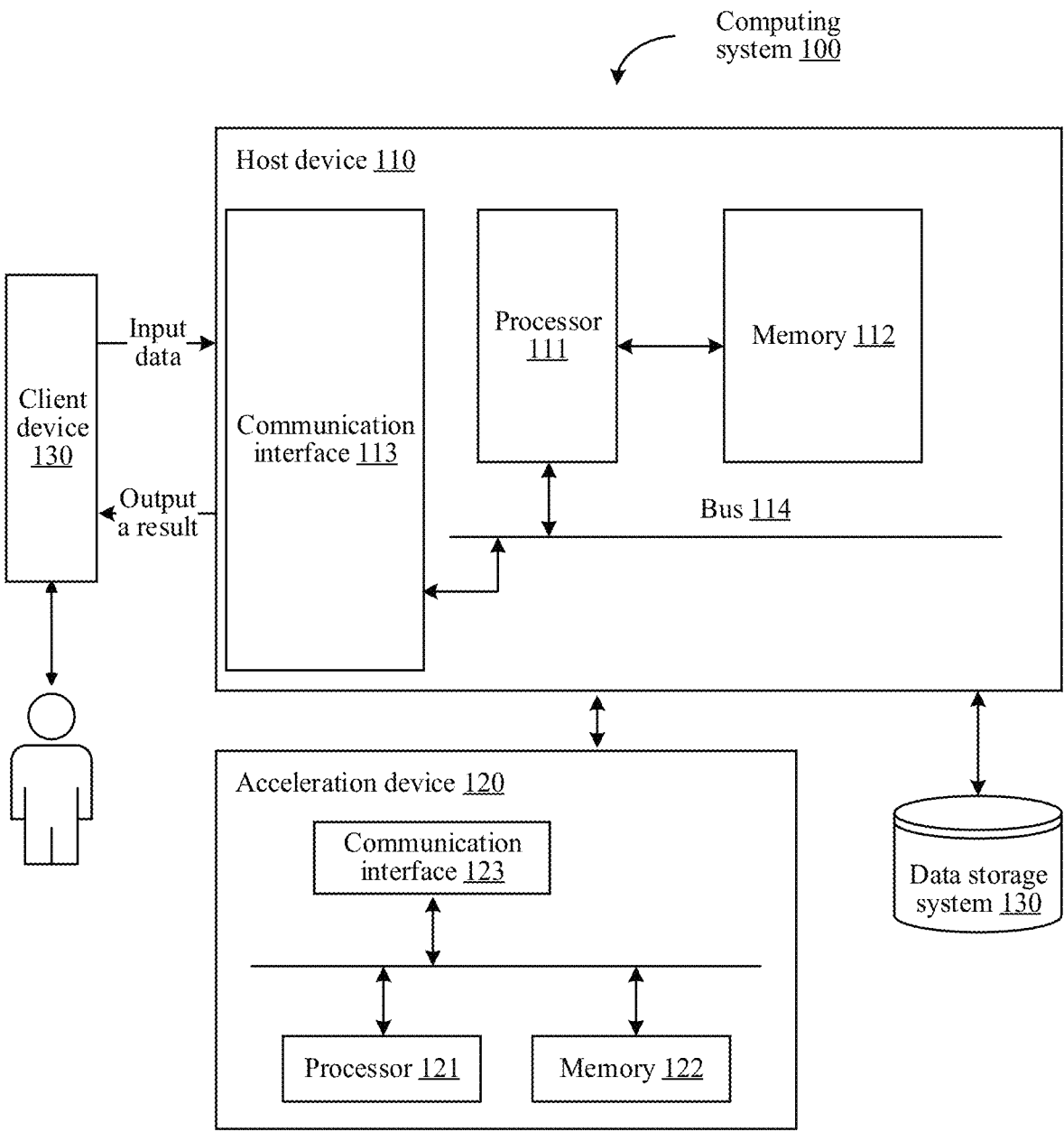
FIG. 2 is a schematic diagram 2 of an architecture of a computing system according to an embodiment of this application.

Refer to FIG. 2. In a second possible example, FIG. 2 is a schematic diagram 2 of an architecture of a computing system according to an embodiment of this application. A difference from the computing system shown in FIG. 1 lies in that, in FIG. 2, the acceleration device 120 is not inserted into the card slot on the mainboard of the host device 110, but is a device independent of the host device 110. In this case, the host device 110 may be connected to the acceleration device 120 by using a wired network such as a network cable, or may be connected to the acceleration device 120 by using a wireless network such as a wireless hotspot or BLUETOOTH.

In other words, in this embodiment of this application, that an acceleration device is coupled to a memory may mean that the acceleration device includes the memory, or the acceleration device is connected to the memory.

In FIG. 1, the host device 110 may be configured to send invocation information to the acceleration device 120, to invoke the acceleration device 120 to process the to-be-processed task. The acceleration device 120 may be configured to perform the to-be-processed task based on the invocation information sent by the host device 110, and feed back an obtained processing result to the host device 110. In this process, the host device 110 and the acceleration device 120 may be combined to implement the computing method provided in embodiments of this application, to resolve a problem of a large data transmission amount in a heterogeneous computing process. For a specific implementation, refer to descriptions in the following computing method embodiments. Details are not described herein again.

Optionally, as shown in FIG. 1, the computing system 100 further includes a client device 130. A user may input data into the host device 110 by using the client device 130. For example, the client device 130 inputs data into the host device 110 by using the communication interface 113. After processing the input data, the host device 110 sends an output result obtained by processing the data to the client device 130 by using the communication interface 113. The client device 130 may be a terminal device, including but not limited to a personal computer, a server, a mobile phone, a tablet computer, an intelligent vehicle, or the like.

In the computing system shown in FIG. 1, categories of the processor in the host device 110 and the processor in the acceleration device 120 may be consistent or inconsistent. This is not limited herein. In other words, in this embodiment of this application, regardless of whether instruction sets and architectures of the host device 110 and the acceleration device 120 are consistent, the host device 110 and the acceleration device 120 can cooperate with each other to implement the computing method provided in embodiments of this application.

In the computing system shown in FIG. 1, operating systems running in the host device 110 and the acceleration device 120 may be consistent or inconsistent. This is not limited herein. For example, an operating system running in the host device 110 is an operating system of a first security level, and an operating system running in the acceleration device 120 is an operating system of a second security level. The first security level is lower than the second security level. In this way, the host device 110 may perform computing processing in the acceleration device with the higher security level, to improve a data security degree.

Figure 3:
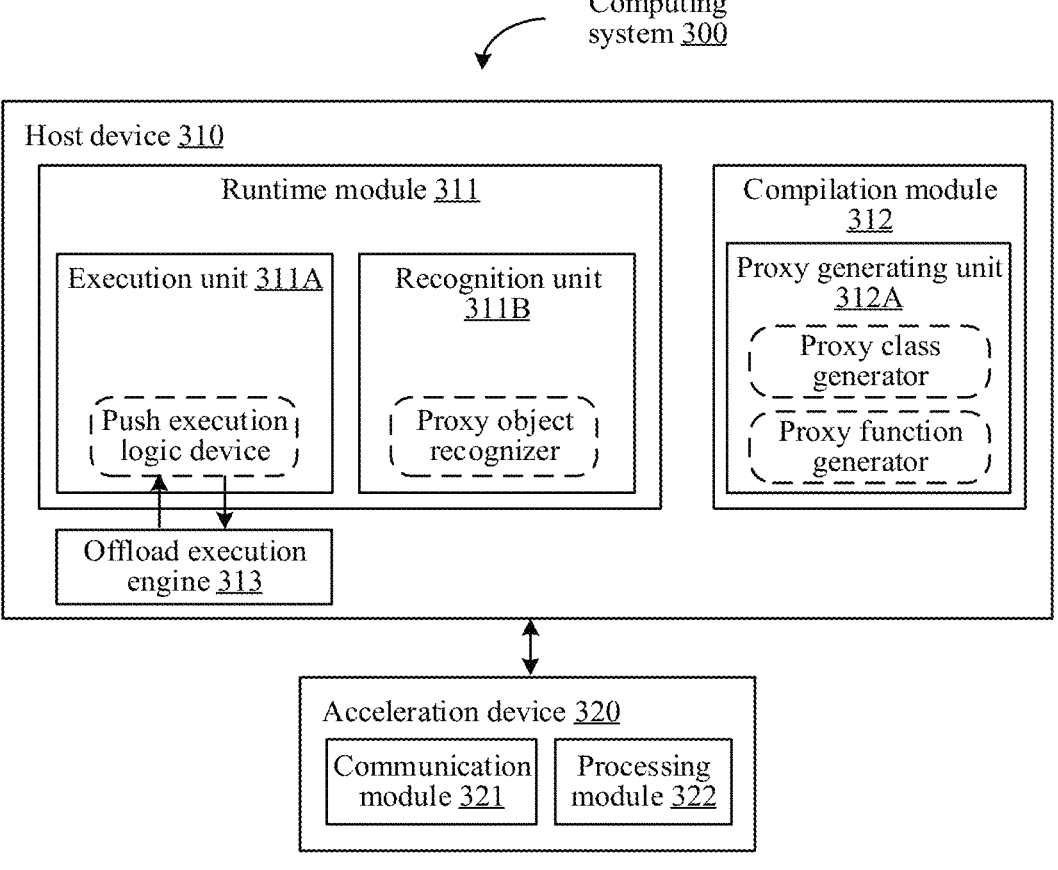
FIG. 3 is a schematic diagram 3 of an architecture of a computing system according to an embodiment of this application.

FIG. 3 is a schematic diagram 3 of an architecture of a computing system according to an embodiment of this application. Refer to FIG. 3. A computing system 300 includes a host device 310 and an acceleration device 320. The host device 310 is in a communication connection with the acceleration device 320.

In some possible embodiments, the computing system 300 shown in FIG. 3 may be implemented by using a hardware circuit, or may be implemented by using a hardware circuit in combination with software, so that a corresponding function is implemented.

In some other possible embodiments, the computing system 300 shown in FIG. 3 may represent a software architecture, and may run on the computing system 100 shown in FIG. 1. In other words, a module/an engine/a unit in the computing system 300 may run on the host device 110 or the acceleration device 120 shown in FIG. 1.

It should be noted that when the host device 310 is implemented by using a plurality of software modules/engines/units, the host device 310 may also be referred to as a computing apparatus. As shown in FIG. 3, the host device 310 includes a runtime module 311, a compilation module 312, and an offload execution engine 313. In addition, the acceleration device 320 may also be referred to as an acceleration apparatus. As shown in FIG. 3, the acceleration device 320 includes a communication module 321 and a processing module 322.

It may be understood that the foregoing module/engine/unit may be implemented by hardware in a form of instructions. For example, the runtime module 311, the compilation module 312, and the offload execution engine 313 may be executed by the processor 111 of the host device 110 in the form of instructions, to implement a corresponding function. For another example, the communication module 321 and the processing module 322 may be executed by the processor 121 of the acceleration device 120 in the form of instructions, to implement a corresponding function.

The following uses an example in which the computing system 300 shown in FIG. 3 represents a software architecture to describe in detail functions of structures of the modules/engines in the computing system 300.

The compilation module 312 is represented as a computer instruction, which may be executed by a processor, and can implement a function of a compilation instruction. The compilation module 312 may include a proxy generating unit 312A. The proxy generating unit 312A can generate a proxy class structure through compilation. In this embodiment of this application, the proxy class structure may include a proxy function and proxy information. The proxy information may be represented as address data, and indicates an address of a memory object. In other words, the proxy information may be a pointer. The proxy function may be represented as a group of computer instructions, which can implement logic encapsulation for preprocessing messages, filtering messages, and transferring messages of a delegate class, and implement conversion between a service of the proxy class and that of the delegate class and encapsulation for a result thereof.

For example, the proxy generating unit 312A includes a proxy class generator and a proxy function generator. The proxy class generator is configured to generate a proxy class structure of a delegate class. The structure may include two groups of data. One group of data may be for recording the proxy information, and the other group of data may be for recording the proxy function. In other words, the two groups of data in the proxy class structure have not recorded the proxy function and the proxy information of the proxy class yet. The proxy function generator is configured to generate the proxy function in the proxy class structure, for example, a function for pushing information to a heterogeneous device. In this way, the proxy class structure of the delegate class may be generated by using the proxy class generator and the proxy function generator.

The runtime module 311 is represented as a computer instruction, which may be executed by a processor, and can implement functions of performing a group of operations (or referred to as logic) and an offload execution action during running. The runtime module 311 may include an execution unit 311A and a recognition unit 311B. The recognition unit 311B is configured to recognize an object currently run on the host device 310. For example, the recognition unit 311B includes a proxy object recognizer. The proxy object recognizer can recognize whether the object currently run on the host device 310 is a proxy object. The execution unit 311A is configured to control access to the memory object by using the proxy object. For example, the execution unit 311A includes a push execution logic device. The push execution logic device may convert an operation performed by the host device 310 on the proxy object into push execution logic, generate invocation information, and trigger the offload execution engine 313 to send the invocation information to the acceleration device 320, to control the access to the memory object in the acceleration device 320.

The offload execution engine 313 is represented as a computer instruction, which may be executed by a processor, and can implement a function of sending information to another computing device. For example, the offload execution engine 313 may send the invocation information to the acceleration device 320 based on triggering of the push execution logic device.

The communication module 321 is configured to implement a function of exchanging data with another device. For example, the communication module 321 may receive the invocation information sent by the host device 310.

The processing module 322 is configured to implement a function of executing a to-be-processed task. For example, the processing module 322 may perform the to-be-processed task based on the invocation information sent by the host device 310.

With reference to the modules/engines in the computing system 300, the computing method provided in embodiments of this application may be implemented, to resolve a problem of a large data transmission amount in a heterogeneous computing process. For more detailed descriptions of the modules/engines/units in the foregoing computing system 300, directly refer to related descriptions in the following embodiments shown in FIG. 4, FIG. 5, FIG. 7, and FIG. 8. Details are not described herein.

The foregoing describes the computing system provided in this application. The following describes the computing method provided in embodiments of this application with reference to the accompanying drawings.

Figure 4:
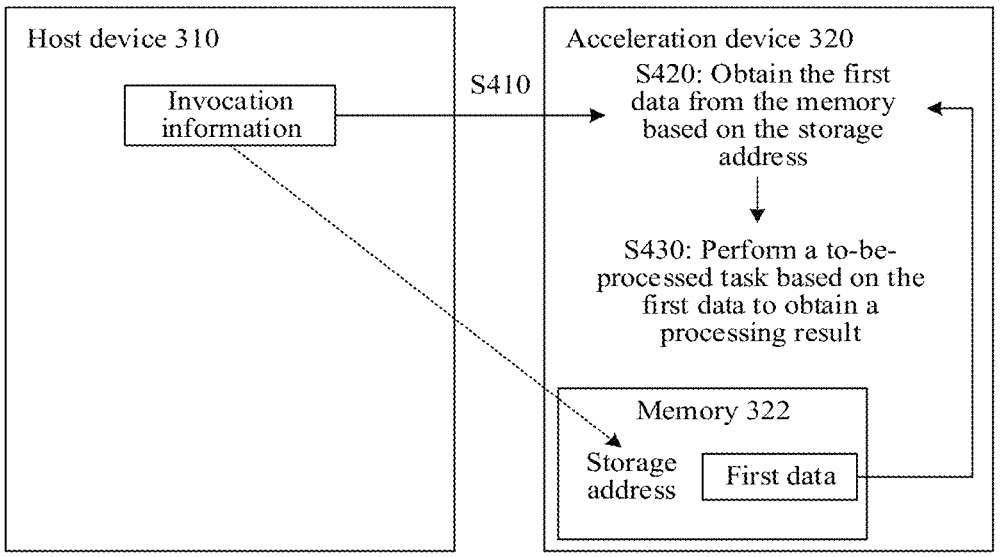
FIG. 4 is a schematic flowchart 1 of a computing method according to an embodiment of this application.

FIG. 4 is a schematic flowchart 1 of a computing method according to this application. The computing method may be applied to the foregoing computing system, and may be performed by the host device and the acceleration device in the foregoing computing system. The computing system 100 shown in FIG. 1 is used as an example. In FIG. 4, a host device 310 may include structures in the host device 110 shown in FIG. 1, and an acceleration device 320 may include structures in the acceleration device 120 shown in FIG. 1. In addition, the acceleration device 320 is coupled to a memory 322. The memory 322 may be disposed outside or inside the acceleration device 320. In FIG. 4, that the memory 322 is disposed inside the acceleration device 320 is merely used as a possible example. The memory 322 stores first data required by a to-be-processed service.

As shown in FIG. 4, the computing method provided in this embodiment includes steps S410 to S430.

S410: The host device 310 sends invocation information to the acceleration device 320. Correspondingly, the acceleration device 320 receives the invocation information sent by the host device 310.

The invocation information indicates a storage address of the first data. For example, the invocation information may include a physical storage address or a virtual storage address of the first data.

In this embodiment of this application, the to-be-processed service may be a big data service, an artificial intelligence service, a cloud computing service, or any other service. Computing involved in these services may include matrix computing, graphics computing, network data exchange, disk read/write, and the like. This is not limited herein.

Data for implementing the to-be-processed service may include one or more groups. The first data is data that is in the one or more groups of data and that needs to be processed by the acceleration device 320. For example, the first data may include input data and a computing instruction (or referred to as a function). A computing device may process the to-be-processed service by processing the input data and the computing instruction. For example, computing involved in the to-be-processed service is the matrix computing. The first data required by the to-be-processed service includes a plurality of matrices and a matrix calculation function. The computing device may perform an operation on the plurality of matrices by using the matrix calculation function to obtain a processing result.

S420: The acceleration device 320 obtains the first data from the memory 322 based on the storage address.

When the invocation information is the virtual storage address of the first data, the acceleration device 320 may convert the virtual storage address of the first data into the physical storage address of the first data, and then read the first data from the memory 322 based on the physical storage address of the first data.

In the embodiment shown in FIG. 4, the memory 322 is disposed inside the acceleration device 320, and the acceleration device 320 may read, based on the storage address and by using a bus, the first data stored in the memory 322.

In an embodiment in which the memory 322 is disposed outside the acceleration device 320, the acceleration device 320 may read, by using a network, the first data stored in the memory 322.

S430: The acceleration device 320 performs the to-be-processed task based on the first data to obtain the processing result.

For example, if the first data includes a matrix 1, a matrix 2, a matrix 3, a matrix inverse operation function, and a matrix sum operation function, and in the to-be-processed task, $(\text{matrix } 1 + \text{matrix } 2 + \text{matrix } 3)^{-1}$ needs to be calculated, the acceleration device may first calculate a sum (denoted as a matrix 4) of the matrix 1, the matrix 2, and the matrix 3 by using the matrix sum operation function, and then calculate an inverse matrix of the matrix 4 by using the matrix inverse operation function, where $(\text{matrix } 4)^{-1}$ is the processing result.

The processing result is a result obtained by processing the first data. When the first data is a part of data in the data for implementing the to-be-processed service, the processing result may be an intermediate result or a final result of the to-be-processed task. When the first data is all data in the data for implementing the to-be-processed service, the processing result may be the final result of the to-be-processed task.

Optionally, the to-be-processed service may include N consecutive operations, and N is an integer greater than 1. In this case, FIG. 5 is a detailed schematic flowchart of S430 according to an embodiment of this application. S430 shown in FIG. 4 may include the following steps.

S431: The acceleration device 320 performs an $(i+1)^{th}$ operation based on a processing result of an $i^{th}$ operation in the N operations, to obtain a processing result of the $(i+1)^{th}$ operation.

i is an integer, $1 \le i \le N-1$, and a processing result of an $N^{th}$ operation is the processing result.

Optionally, in the embodiment shown in FIG. 4, the memory 322 is disposed inside the acceleration device 320, and the processing result of the $i^{th}$ operation may be stored in the memory 322.

In the embodiment in which the memory 322 is disposed outside the acceleration device 320, the processing result of the $i^{th}$ operation may be stored in the memory 322 or a memory inside the acceleration device 320. This is not limited herein.

For example, the to-be-processed service includes three consecutive operations that are respectively an operation 1, an operation 2, and an operation 3. The operation 1 is to calculate a sum (denoted as the matrix 4) of the matrix 1, the matrix 2, and the matrix 3 by using the matrix sum operation function. The operation 2 is to calculate the inverse matrix (the $(\text{matrix } 4)^{-1}$) of the matrix 4 by using the matrix inverse operation function. The operation 3 is to calculate a sum (denoted as a matrix 5) of the $(\text{matrix } 4)^{-1}$ and the matrix 1 by using the matrix sum operation function. In this case, the matrix 4 and the $(\text{matrix } 4)^{-1}$ are intermediate processing results, and the matrix 5 is the processing result. Both the matrix 4 and the $(\text{matrix } 4)^{-1}$ may be stored in the memory 322, and the matrix 5 may also be stored in the memory 322.

In S431, all the N consecutive operations in the to-be-processed service are processed by the acceleration device 320. In other words, intermediate processing results of a plurality of operations in the to-be-processed service may not be repeatedly transmitted between the host device and the acceleration device, to reduce the data transmission amount and improve computing efficiency.

Based on S410 to S430, the host device 310 notifies the acceleration device 320 of the storage address such that the acceleration device 320 directly obtains the data from the memory 322 based on the storage address and performs processing. This prevents the host device 310 from obtaining data from the memory 322 and then transmitting the data to the acceleration device 320. In other words, the data does not need to be transmitted for a plurality of times from the storage device to the host device to the acceleration device such that a data transmission amount in the computing system can be reduced, bandwidth resources can be saved, and offload push efficiency can be improved. Therefore, a problem of a large data transmission amount in a heterogeneous computing process is resolved. In addition, an instruction structure of the first data required by the to-be-processed service may be further retained by performing S410 to S430, to avoid large-scale code reconstruction and improve development efficiency.

It should be noted that, when S410 is implemented by the host device 310 or the software module/engine/unit included in the acceleration device 320, S410 may be performed by the offload execution engine 313 and the communication module 321 shown in FIG. 3. For example, the offload execution engine 313 sends the invocation information to the acceleration device 320, and the communication module 321 receives the invocation information sent by the host device 310.

When S420 and S430 are implemented by the software module/engine/unit included in the acceleration device 320, S420 and S430 may be performed by the processing module 322 shown in FIG. 3. For example, S420, S430, and S431 may all be performed by the processing module 322.

Optionally, the first data is stored in a memory object, and the memory object is storage space of a segment of physical addresses provided by the memory 322. The first data may be a resource object, a persistent object, and a connection object. In other words, in the method embodiment shown in FIG. 4, the acceleration device 320 may be invoked in a form of proxy to process the resource object, the persistent object, the connection object, or the like such as to support heterogeneous computing of the resource object, the persistent object, the connection object, and the like, avoid code reconstruction and reduce costs.

Optionally, after S430, the method shown in FIG. 4 further includes the following step.

S440: The acceleration device 320 sends the processing result to the host device 310. Correspondingly, the host device 310 receives the processing result sent by the acceleration device 320.

It should be noted that the host device 310 may further include a communication module. When S440 is implemented by the software module/engine/unit included in the host device 310 or the acceleration device 320, S440 may be performed by the communication module 321 shown in FIG. 3 and the communication module in the host device 310. For example, the communication module 321 sends the processing result to the host device 310, and the communication module in the host device 310 receives the processing result sent by the acceleration device 320.

Optionally, before S410, the method shown in FIG. 4 further includes the following step.

S401: The host device 310 obtains proxy information, and generates the invocation information based on the proxy information.

The proxy information includes the virtual storage address of the first data. Optionally, the proxy information is stored in the host device 310.

Optionally, before S410, the method shown in FIG. 4 further includes the following step.

S402: The acceleration device 320 sends the virtual storage address of the first data to the host device 310. Correspondingly, the host device 310 receives the virtual storage address that is of the first data and that is sent by the acceleration device 320. In this way, the host device may determine the proxy information based on the virtual storage address of the first data.

With reference to S401 and S402, a manner in which the host device 310 obtains the proxy information may include that the host device 310 receives the virtual storage address that is of the first data and that is sent by the acceleration device 320, and determines the proxy information based on the virtual storage address of the first data.

It should be noted that, when S401 and S402 are implemented by the software module/engine/unit included in the host device 310 or the acceleration device 320, S401 and S402 may be performed by the runtime module 311, the communication module 321 shown in FIG. 3, and the communication module in the host device 310. For example, S401 is performed by the runtime module 311. The communication module 321 is configured to send the virtual storage address of the first data to the host device 310. The communication module in the host device 310 is configured to receive the virtual storage address that is of the first data and that is sent by the acceleration device 320.

Based on the foregoing method embodiment, the host device 310 and the acceleration device 320 may be combined together to implement a compilation process and a mapping process. In the compilation process, a proxy class structure may be generated through compilation. In the mapping process, the proxy information may be written into the proxy class structure, and a proxy object may be determined. S401 and S402 may be included in the mapping process. In addition, S410 to S440 may be considered as an execution process.

The following separately describes detailed implementations of the compilation process, the mapping process, and the execution process.

1. The compilation process includes the following step 1.1 to step 1.4.

Step 1.1: The host device 310 obtains service data, and determines, based on an identifier in the service data, whether the acceleration device 320 needs to be invoked to execute a first object in the service data. If the acceleration device 320 needs to be invoked to execute the first object in the service data, step 1.2 is performed. Otherwise, step 1.4 is performed.

The service data refers to the data for implementing the to-be-processed service. For related descriptions of the to-be-processed service, refer to the foregoing method embodiment. Details are not described herein again.

The service data may include one or more first objects. The first object herein may refer to an object in the programming field, to be specific, an objective object is abstracted as a computer instruction and/or data. For example, the first object herein may be a resource object, a persistent object, a connection object, or the like, which is not limited herein.

The identifier in the service data may indicate whether the first object in the service data needs proxy. If the identifier in the service data indicates that the first object needs the proxy, it indicates that the first object needs to invoke the acceleration device for processing. If the identifier in the service data indicates that the first object does not need the proxy, it indicates that the first object does not need to invoke the acceleration device for processing.

The identifier in the service data may be preset, for example, may be set by a user. The user may add the identifier to a preset location of the service data to indicate whether the first object in a first service needs the proxy. The preset location may be data corresponding to a service offload procedure part in the service data.

Step 1.2: The host device 310 determines a delegate class corresponding to the first object, and generates a proxy class structure corresponding to the delegate class.

Step 1.3: The host device 310 generates a proxy function in the proxy class structure.

For example, the host device 310 generates the proxy class structure of the delegate class corresponding to the first object. The structure may include two groups of data, a first group of data may be for recording the proxy information, and a second group of data may be for recording the proxy function. In step 1.2, the two groups of data in the proxy class structure have not recorded the proxy function and the proxy information of the proxy class yet. The host device 310 may generate the proxy function in the second group of data. The proxy function indicates a function in the delegate class.

Figure 6:
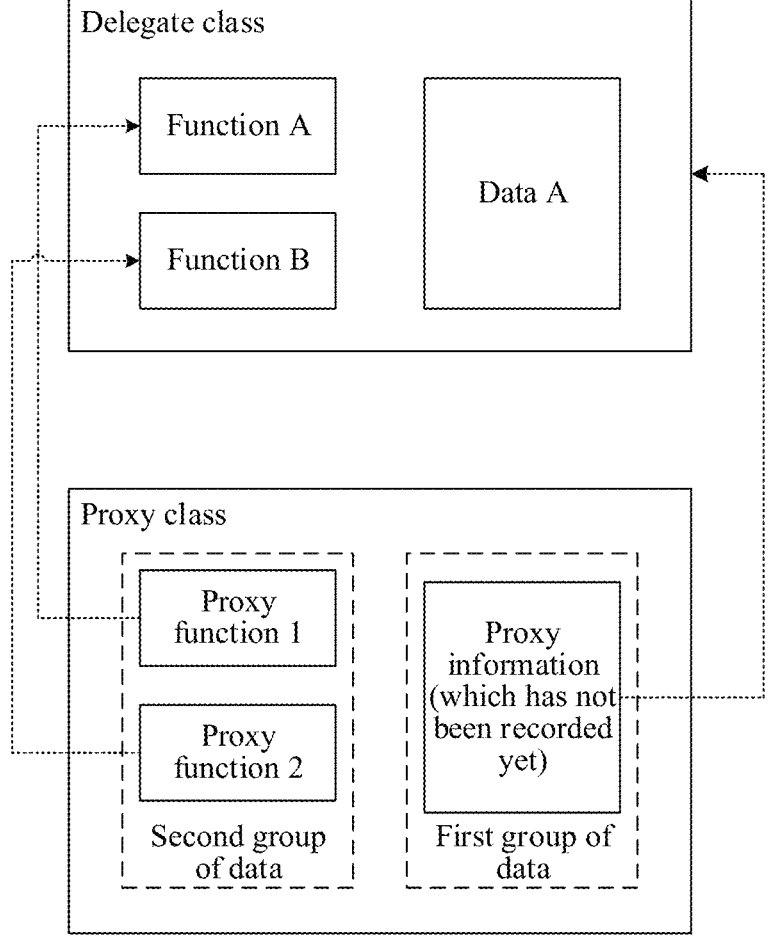
FIG. 6 is a schematic diagram of a mapping relationship between a proxy class and a delegate class according to an embodiment of this application.

For example, FIG. 6 is a schematic diagram of a mapping relationship between a proxy class and a delegate class according to an embodiment of this application. Refer to FIG. 6. A second group of data in the proxy class includes a proxy function 1 and a proxy function 2. The delegate class includes a function A, a function B, and data A. The proxy function 1 indicates the function A, the proxy function 2 indicates the function B, a first group of data in the proxy class is for storing the proxy information, and the proxy information may indicate a storage address of a memory object.

Step 1.4: The host device 310 generates an executable program based on the service data.

In step 1.1 to step 1.4, the mapping relationship between the proxy class and the delegate class that is shown in FIG. 6 is generated. The proxy object may be generated by using the proxy class, and a proxied object (that is, the memory object) may be generated by using the delegate class. In another words, the proxy object associated with the memory object may be generated based on the foregoing mapping relationship between the proxy class and the delegate class. For a detailed implementation, refer to the following mapping process.

It should be noted that, when step 1.1 to step 1.4 are implemented by the software module/engine/unit included in the host device 310, the steps may be performed by the compilation module 312 shown in FIG. 3. For example, step 1.1 to step 1.4 may be performed by the compilation module 312. Step 1.2 is executed by the proxy class generator of the proxy generating unit 312A in the compilation module 312. Step 1.3 is executed by the proxy function generator of the proxy generating unit 312A in the compilation module 312.

Figure 7:
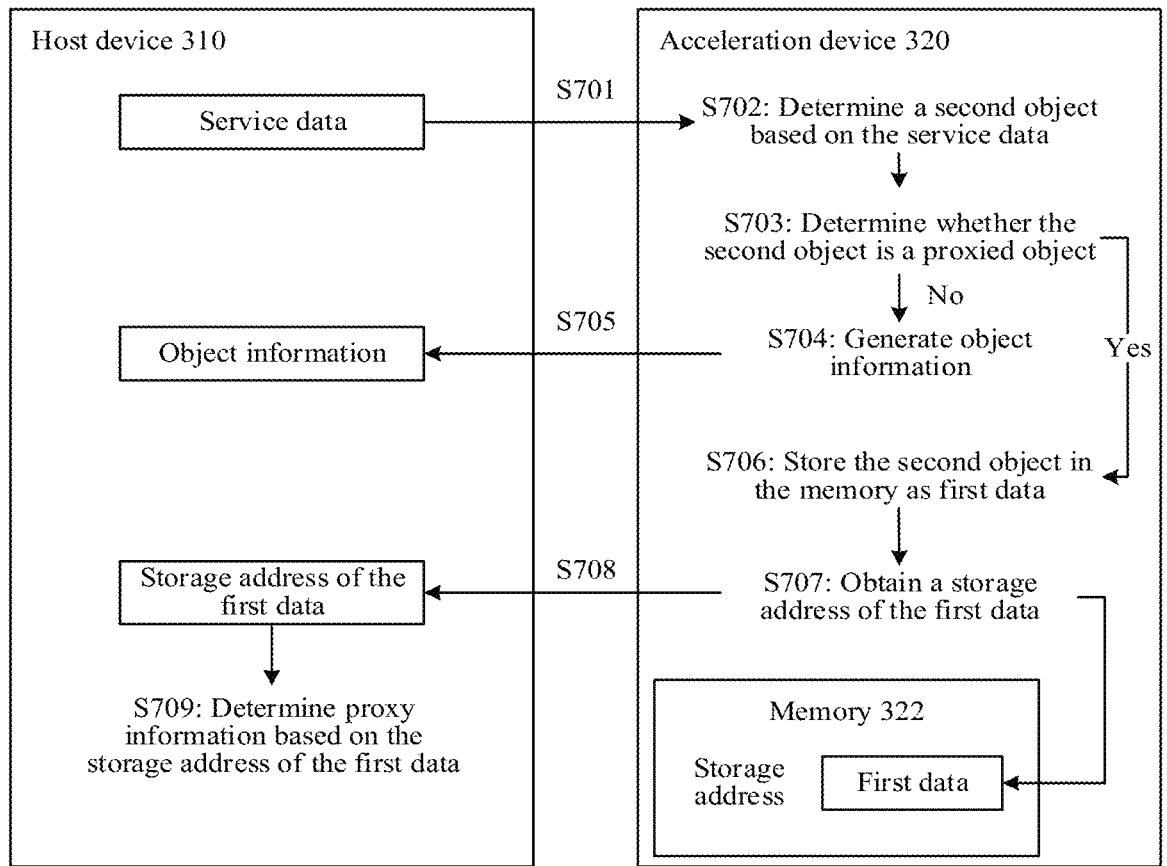
FIG. 7 is a schematic flowchart 2 of a computing method according to an embodiment of this application.

2. For the mapping process, refer to FIG. 7. FIG. 7 is a schematic flowchart 2 of a computing method according to an embodiment of this application. The computing method includes steps S701 to S709.

S701: The host device 310 sends the service data to the acceleration device 320. Correspondingly, the acceleration device 320 receives the service data sent by the host device 310.

For related descriptions of the service data, refer to the foregoing method embodiment. Details are not described herein again.

S702: The acceleration device 320 determines a second object based on the service data.

The second object is similar to the first object. For related descriptions, refer to the foregoing descriptions of the first object. Details are not described herein again.

S703: The acceleration device 320 determines whether the second object is the proxied object.

When the second object is not the proxied object, S704 is performed. When the second object is the proxied object, S706 is performed.

Whether the object is the proxied object may be determined based on returned information of the second object. For example, when the returned information of the second object indicates proxy of the second object, it indicates that the object is the proxied object. When the returned information of the second object indicates the second object, it indicates that the object is the proxied object.

S704: The acceleration device 320 generates object information.

The object information may indicate the second object. For example, the acceleration device 320 may serialize the second object to obtain a transmission sequence, where the transmission sequence is the object information.

S705: The acceleration device 320 sends the object information to the host device 310. Correspondingly, the host device 310 receives the object information sent by the acceleration device 320.

S706: The acceleration device 320 stores the second object in the memory as the first data.

S707: The acceleration device 320 obtains the storage address of the first data.

S708: The acceleration device 320 sends the storage address of the first data to the host device 310. Correspondingly, the host device 310 receives the storage address that is of the first data and that is sent by the acceleration device 320.

S709: The host device 310 determines proxy information of the second object based on the storage address of the first data.

For example, it is assumed that the host device 310 has generated a proxy class of the second object through the foregoing compilation process. In S709, the host device 310 may generate a structure of the second object by using the proxy class, and then write the storage address of the first data as the proxy information into a first group of data of the structure of the second object.

S708 corresponds to S402, and S709 corresponds S401. For related descriptions of S707 to S709, refer to the foregoing embodiment.

Before S701, the method may further include that the host device 310 determines one acceleration device from a plurality of acceleration devices as the acceleration device 320. For example, the host device 310 may determine an acceleration device that is in the plurality of acceleration devices and that is closest to the memory of the host device 310 as the acceleration device 320. In this way, unnecessary data copies may be significantly reduced, data computing and processing efficiency may be improved, and near-data computing for invocation may be implemented.

In S701 to S709, the proxy object associated with the memory object may be generated. In this case, the host device 310 may invoke the memory object in the acceleration device 320 based on the proxy information and the proxy function in the proxy object. For a detailed implementation, refer to the following execution process.

It should be noted that, when S701 to S709 are implemented by the software module/engine/unit included in the host device 310 or the acceleration device 320, S701 to S709 may be performed by the runtime module 311, the communication module 321, the processing module 322 shown in FIG. 3, and the communication module in the host device 310. For example, S701, S705, and S708 are performed by the communication module in the host device 310 and the communication module 321. S702 to S704, S706, and S707 are performed by the processing module 322. S709 is performed by the runtime module 311.

Figure 8:
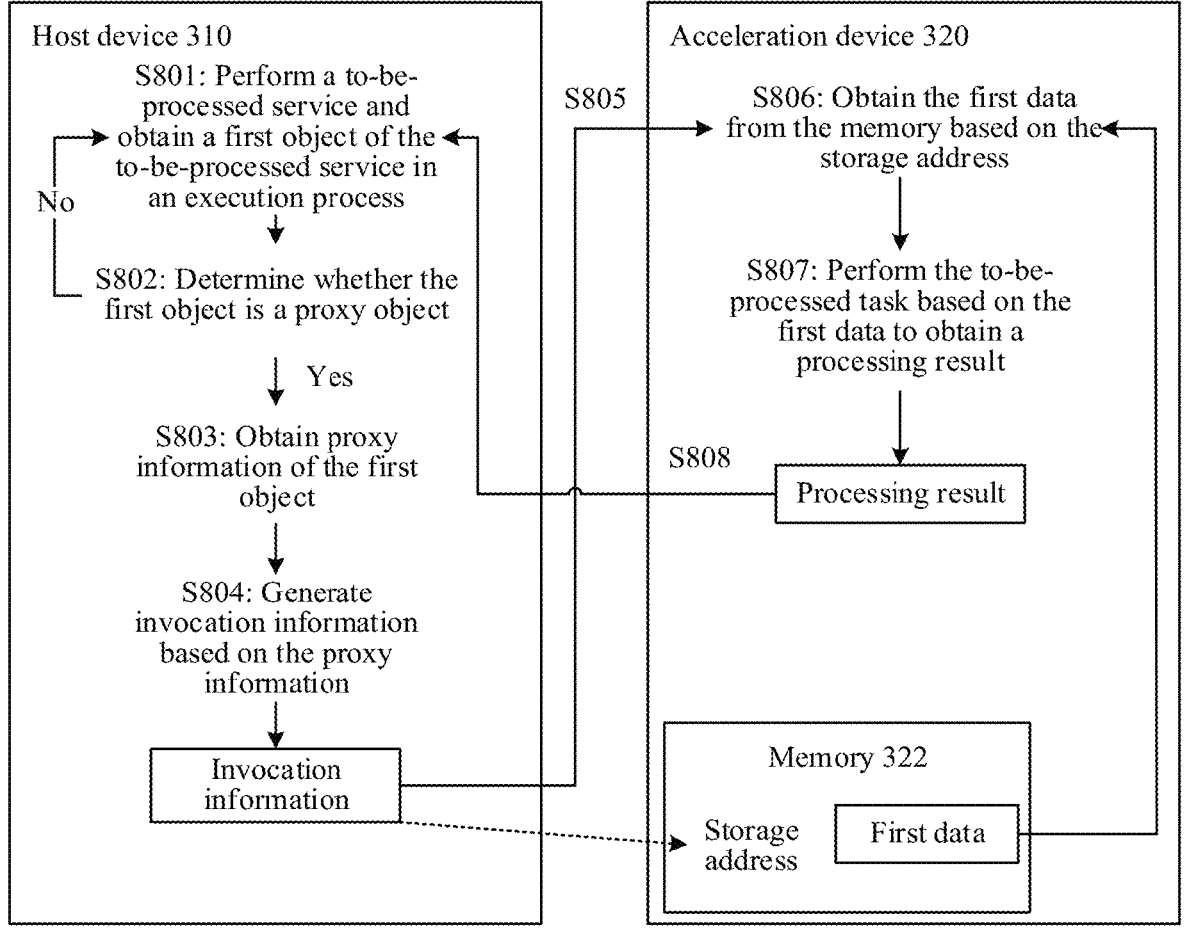
FIG. 8 is a schematic flowchart 3 of a computing method according to an embodiment of this application.

3. For the execution process, refer to FIG. 8. FIG. 8 is a schematic flowchart 3 of a computing method according to an embodiment of this application. The computing method includes the following steps S801 to S808.

S801: The host device 310 performs the to-be-processed service based on the service data, and obtains a third object of the to-be-processed service in the execution process.

For related descriptions of the service data, refer to the foregoing method embodiment. Details are not described herein again. The third object is similar to the first object. For related descriptions, refer to the foregoing descriptions of the first object. Details are not described herein again.

For example, a manner in which the host device 310 obtains the third object may be that when a function in the service data is executed, an object corresponding to the function is determined as the third object.

S802: The host device 310 determines whether the third object is the proxy object.

For example, it is assumed that a plurality of proxy objects is determined through the foregoing mapping process. If an object that is the same as the third object exists in the plurality of proxy objects, the third object may be determined as the proxy object; or otherwise, the third object may not be determined as the proxy object.

When the third object is the proxy object, S803 is performed. Otherwise, S801 is performed until processing of the to-be-processed service is completed.

S803: The host device 310 obtains proxy information of the third object.

S804: The host device 310 generates invocation information based on the proxy information.

The invocation information may include the virtual storage address of the first data and function execution information. The function indication information indicates the acceleration device 320 to execute a function in the memory object. For example, refer to FIG. 6. The function indication information may include the proxy function 1, and the function indication information may indicate the acceleration device 320 to execute the function A in the memory object. In this way, the invocation information may invoke the acceleration device 320 to execute a function in a memory object, to refine an invocation granularity and improve invocation efficiency.

S805: The host device 310 sends the invocation information to the acceleration device 320. Correspondingly, the acceleration device 320 receives the invocation information sent by the host device 310.

S806: The acceleration device 320 obtains the first data from the memory based on the storage address.

S807: The acceleration device 320 performs the to-be-processed task based on the first data to obtain the processing result.

S808: The acceleration device 320 sends the processing result to the host device 310. Correspondingly, the host device 310 receives the processing result sent by the acceleration device 320.

For S803 to S808, refer to related descriptions of the foregoing method embodiment (including S410 to S440). Details are not described herein again.

In S801 to S808, when executing the to-be-processed service, the host device 310 encounters an object that needs to be processed by invoking the acceleration device 320, and may invoke the acceleration device 320 for processing by using the invoking information. This process does not interfere with the processing of the to-be-processed task on a side of the host device 310. In addition, an action performed by the acceleration device 320 may be consistent with an action performed by the host device 310. In other words, control flows of the host device 310 and the acceleration device 320 may be unified such that a data transmission amount can be reduced, and a degree of programming fragmentation can be reduced.

It should be noted that, when S801 to S808 are implemented by the software module/engine/unit included in the host device 310 or the acceleration device 320, S801 to S808 may be performed by the runtime module 311, the offload execution engine 313, the communication module 321, the processing module 322 shown in FIG. 3, and the communication module in the host device 310. For example, S808 is performed by the communication module in the host device 310 and the communication module 321. S806 and S807 are performed by the processing module 322. S801 to S804 are performed by the runtime module 311. S805 is performed by the offload execution engine 313.

Based on the foregoing method embodiments, the following further describes the method embodiment with reference to several examples.

Figure 9:
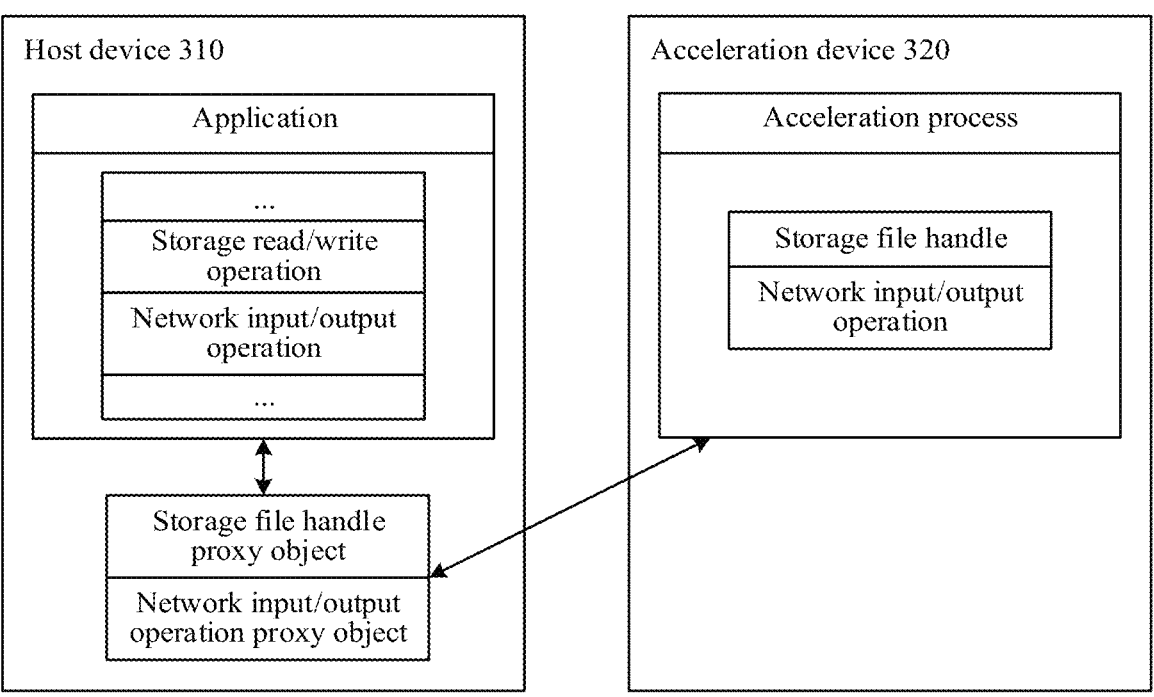
FIG. 9 is a schematic diagram 1 of application acceleration according to an embodiment of this application.

Example 1: FIG. 9 is a schematic diagram of application acceleration according to an embodiment of this application.

The host device 310 runs an application (application). The application includes a storage read/write operation and a network input/output operation. The application may be for implementing the to-be-processed service. The host device 310 further includes a storage file handle proxy object and a network input/output operation proxy object. An acceleration process runs in the acceleration device 320. The acceleration process includes a storage file handle and the network input/output operation.

According to the method embodiments shown in FIG. 4 to FIG. 8, the host device 310 may invoke, by using the storage file handle proxy object and the network input/output operation proxy object, the acceleration device 320 to perform the storage file handle operation and the network input/output operation, so that the data transmission amount in the computing system can be reduced, bandwidth resources can be saved, and offload push efficiency can be improved. In addition, in this process, the host device 310 operates the proxy object instead of the storage file handle and the network input/output operation. In this way, a problem that a resource object, a persistent object, a connection object, and the like cannot be serialized and returned to the host device, the host device cannot retain a process in which there is no offload push execution, and reconstruction and modification are required is resolved. In other words, support for the heterogeneous computing of the resource object, the persistent object, the connection object, and the like may be implemented, to avoid code reconstruction and reduce costs.

It should be noted that the storage read/write operation usually exists in an intelligent SSD scenario, and the network input/output operation usually exists in an intelligent network interface card scenario. In other words, the acceleration device 320 shown in FIG. 9 may be a smart SSD or an intelligent network interface card.

Figure 10:
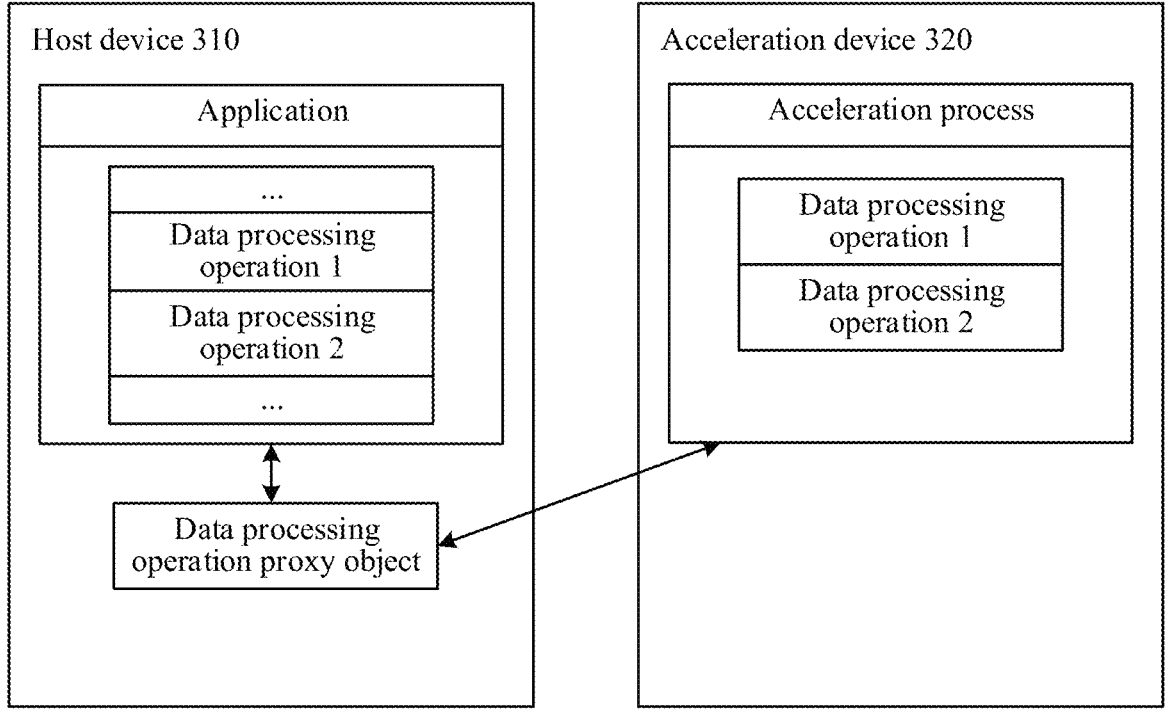
FIG. 10 is a schematic diagram 2 of application acceleration according to an embodiment of this application.

Example 2: FIG. 10 is a schematic diagram 2 of application acceleration according to an embodiment of this application.

The host device 310 runs an application. The application includes a data processing operation 1 and a data processing operation 2. The application may be for implementing the to-be-processed service. The data processing operation 1 and the data processing operation 2 are consecutive operations, to be specific, a dependency relationship exists between the data processing operation 1 and the data processing operation 2 in a time sequence. For example, a processing result of the data processing operation 1 is input data of the data processing operation 2. The host device 310 further includes a data processing operation proxy object. An acceleration process runs in the acceleration device 320, and the acceleration process includes the data processing operation 1 and the data processing operation 2.

According to the method embodiments shown in FIG. 4 to FIG. 8, the host device 310 may invoke the acceleration device 320 to perform the data processing operation 1 and the data processing operation 2 by using the data processing operation proxy object. In this way, a processing result returned by the acceleration device 320 to the host device 310 is a processing result of the data processing operation 2, and the data processing operation 1 is no longer fed back to the host device 310 such that intermediate processing results of a plurality of operations in the to-be-processed service may not be repeatedly transmitted between the host device and the acceleration device, to reduce the data transmission amount and improve computing efficiency.

In the foregoing computing method embodiments, in comparison with heterogeneous offload using a unified memory management capability, the computing methods provided in embodiments of this application can reduce sharing and use of a memory page between the host device and the acceleration device, improve usage efficiency of unified memory addressing, and save a bandwidth between the host device and the acceleration device. In comparison with local heterogeneous offload without a Unified Shared Memory (USM), the computing methods provided in embodiments of this application can reduce an amount of direct memory access (DMA) data between the host device and the acceleration device, improve the offload efficiency, and save a bandwidth between the host device and a heterogeneous device. In comparison with remote push offload, the computing methods provided in embodiments of this application can reduce network data transmission between the host device and the acceleration device, reduce object information transmission on which a control flow depends, improve the offload efficiency, and save the bandwidth between the host device and the acceleration device.

It can be understood that, to implement the functions in the foregoing embodiments, the host device and the acceleration device include corresponding hardware structures and/or software modules for performing functions. A person skilled in the art should be easily aware that, in combination with the units and the method steps in the examples described in embodiments disclosed in this application, this application can be implemented by using hardware or a combination of hardware and computer software. Whether a function is performed by using hardware or hardware driven by computer software depends on particular application scenarios and design constraints of the technical solutions.

For example, when the methods shown in FIG. 4, FIG. 5, FIG. 7, and FIG. 8 are implemented by the software module/ unit, the host device 310 in FIG. 3 is a computing apparatus, and the acceleration device 320 is an acceleration apparatus. A possible example is provided herein with reference to FIG. 3 to describe the computing apparatus and the acceleration apparatus.

The computing apparatus may be configured to implement a function of the host device 310 in the foregoing method embodiments, and the acceleration apparatus may be configured to implement a function of the acceleration device 320 in the foregoing method embodiments. Therefore, the computing apparatus can implement beneficial effects of the foregoing method embodiments in combination with the acceleration apparatus. In embodiments of this application, the computing apparatus may be the host device 310 shown in FIG. 3, or may be the host devices shown in FIG. 1 and FIG. 2, or may be a module (for example, a chip) used in the host device. The acceleration apparatus may be the acceleration device 320 shown in FIG. 3, or may be the acceleration devices shown in FIG. 1 and FIG. 2, or may be a module (for example, a chip) used in the acceleration device.

As shown in FIG. 3, the computing apparatus includes the runtime module 311, the compilation module 312, and the offload execution engine 313. The acceleration apparatus includes the communication module 321 and the processing module 322. The computing apparatus is configured to implement a function of the host device in the method embodiment shown in FIG. 4. The acceleration apparatus is configured to implement a function of the acceleration device in the method embodiment shown in FIG. 4. In a possible example, a specific process in which the computing apparatus and the acceleration apparatus are configured to implement the foregoing computing methods includes the following content 1 to content 3.

1. The offload execution engine 313 is configured to send the invocation information to the acceleration device 320. The communication module 321 is configured to receive the invocation information sent by the offload execution engine 313.

2. The processing module 322 is configured to obtain the first data from the memory 322 based on the storage address.

3. The processing module 322 is further configured to perform the to-be-processed task based on the first data to obtain the processing result. For how to perform the to-be-processed task based on the first data to obtain the processing result, refer to S431. Details are not described herein again.

In this case, in this embodiment, the host device notifies the acceleration device of the storage address, so that the acceleration device directly obtains the data from the memory based on the storage address and performs processing. This prevents the host device from obtaining the data from the memory and then transmitting the data to the acceleration device. In this way, a data transmission amount in the computing system can be reduced, bandwidth resources can be saved, and offload push efficiency can be improved. Therefore, a problem of a large data transmission amount in a heterogeneous computing process is resolved. In addition, the instruction structure of the first data required by the to-be-processed service may be further retained by performing S410 to S430, to avoid the large-scale code reconstruction and improve the development efficiency.

Optionally, the apparatus may further implement other steps in the foregoing computing methods. For details, refer to the steps shown in FIG. 5, FIG. 7, and FIG. 8. Details are not described herein again.

It should be understood that the computing apparatus or the acceleration apparatus in embodiments of this application of the present disclosure may be implemented by using a CPU, or may be implemented by using an ASIC, or may be implemented by using a programmable logic device (PLD). The PLD may be a complex programmable logic device (CPLD), an FPGA, generic array logic (GAL), or any combination thereof. When the computing apparatus or the acceleration apparatus implements the computing method shown in any one of FIG. 4, FIG. 5, FIG. 7, and FIG. 8 by using software, the computing apparatus or the acceleration apparatus and modules thereof may alternatively be software modules.

For more detailed descriptions of the computing apparatus or the acceleration apparatus, directly refer to related descriptions in embodiments shown in FIG. 4, FIG. 5, FIG. 7, and FIG. 8. Details are not described herein again.

Based on the foregoing computing method embodiments, the computing system 100 shown in FIG. 1 is used as an example for the computing systems provided in embodiments of this application. When the host device 110 is configured to implement the methods shown in FIG. 4, FIG. 5, FIG. 7, and FIG. 8, the processor 111 and the communication interface 113 are configured to perform the function of the host device. The processor 111, the communication interface 113, and the memory 112 may further collaboratively implement the operation steps in the computing methods performed by the host device. The host device 110 may further perform a function of the computing apparatus shown in FIG. 3. Details are not described herein again. The memory 112 in the host device 110 may be configured to store a software program and a module, for example, a program instruction/module corresponding to the computing methods provided in embodiments of this application. The processor 111 in the host device 110 executes the software program and the module that are stored in the memory 112, to perform various function applications and data processing. The communication interface 113 in the host device 110 is configured to perform signaling or data communication with another device. In this application, the host device 110 may have a plurality of communication interfaces 113.

It should be understood that the host device 110 in embodiments of this application may correspond to the computing apparatus in embodiments of this application, and may correspond to corresponding bodies in the method embodiments shown in FIG. 4, FIG. 5, FIG. 7, and FIG. 8 in embodiments of this application. In addition, the units/modules in the host device 110 can implement corresponding procedures of the methods in FIG. 4, FIG. 5, FIG. 7, and FIG. 8. For brevity, details are not described herein again.

Based on the foregoing computing method embodiments, the computing system 100 shown in FIG. 1 is used as an example for the computing systems provided in embodiments of this application. When the acceleration device 120 is configured to implement the methods shown in FIG. 4, FIG. 5, FIG. 7, and FIG. 8, the processor 121 and the communication interface 123 are configured to perform the function of the acceleration device. The processor 121, the communication interface 123, and the memory 122 may further collaboratively implement the operation steps in the computing methods performed by the acceleration device. The acceleration device 120 may further perform a function of the acceleration apparatus shown in FIG. 3. Details are not described herein again. The memory 122 in the acceleration device 120 may be configured to store a software program and a module, for example, a program instruction/module corresponding to the computing methods provided in embodiments of this application. The processor 121 in the acceleration device 120 executes the software program and the module that are stored in the memory 122, to perform various function applications and data processing. The communication interface 123 in the acceleration device 120 is configured to perform signaling or data communication with another device. In this application, the acceleration device 120 may have a plurality of communication interfaces 123.

It should be understood that the acceleration device 120 in embodiments of this application may correspond to the acceleration apparatus in embodiments of this application, and may correspond to corresponding bodies in the method embodiments shown in FIG. 4, FIG. 5, FIG. 7, and FIG. 8 in embodiments of this application. In addition, the units/modules in the acceleration device 120 can implement corresponding procedures of the methods in FIG. 4, FIG. 5, FIG. 7, and FIG. 8. For brevity, details are not described herein again.

It can be understood that the processor in embodiments of this application may be a CPU, an NPU, or a GPU, or may be another general-purpose processor, a DSP, an ASIC, an FPGA, or another programmable logic device, a transistor logic device, a hardware component, or any combination thereof. The general-purpose processor may be a microprocessor or any regular processor.

The method steps in embodiments of this application may be implemented in a hardware manner, or may be implemented in a manner of executing software instructions by the processor. The software instructions may include a corresponding software module. The software module may be stored in a RAM, a flash memory, a ROM, a PROM, an EPROM, an electrically EPROM (EEPROM), a register, a hard disk drive, a removable hard disk drive, a compact disc (CD)-ROM, or any other form of storage medium well-known in the industry. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a network device or a terminal device. Certainly, the processor and the storage medium may alternatively exist as discrete components in the network device or the terminal device.

One or more of the foregoing modules or units may be implemented by software, hardware, or a combination thereof. When any one of the foregoing modules or units is implemented by software, the software exists in a form of a computer program instruction, and is stored in the memory. The processor may be configured to execute the program instruction and implement the foregoing method procedures. The processor may include but is not limited to at least one of a CPU, a microprocessor, a digital signal processor (DSP), a microcontroller unit (MCU), or a computing device used for running software like an artificial intelligence processor. Each computing device may include one or more cores for executing software instructions to perform an operation or processing. The processor may be built into a SoC (system-on-a-chip) or an ASIC, or may be an independent semiconductor chip. In addition to a core for executing the software instruction to perform the operation or the processing, the processor may further include a necessary hardware accelerator, such as an FPGA, a PLD, or a logic circuit that implements a dedicated logical operation.

When the foregoing modules or units are implemented by hardware, the hardware may be any one of or any combination of a CPU, a microprocessor, a DSP, an MCU, an artificial intelligence processor, an ASIC, a SoC, an FPGA, a PLD, a dedicated digital circuit, a hardware accelerator, or a non-integrated discrete device. The hardware may run necessary software or without software to execute the foregoing method procedures.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded or executed on a computer, all or some of the procedures or functions according to embodiments of this application of the present disclosure are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website station, a computer, a server, or a data center to another website station, another computer, another server, or another data center in a wired or wireless manner. The wired manner may be a coaxial cable, an optical fiber, a digital subscriber line (DSL), or the like. The wireless manner may be infrared, wireless, microwave, or the like.

The computer-readable storage medium may be any usable medium accessible by the computer, or a data storage device, such as a server or a data center that integrates one or more usable media. The usable medium may be a magnetic medium (for example, a floppy disk drive, a hard disk drive, or a magnetic tape), an optical medium (for example, a DIGITAL VERSATILE DISC (DVD)), or a semiconductor medium. The semiconductor medium may be a SSD.

The foregoing descriptions are merely specific implementations of this application. Any variation or replacement readily figured out by a person skilled in the art based on the specific implementations provided in this application shall fall within the protection scope of this application.

The invention claimed is:

1. A system comprising:
a host device configured to send invocation information, wherein the invocation information indicates a storage address of first data for a to-be-processed service, wherein the to-be-processed service comprises N consecutive operations, and wherein N is an integer greater than 1;
a memory configured to store the first data; and
an acceleration device coupled to the host device and the memory and configured to:
receive the invocation information from the host device;
obtain the first data from the memory based on the storage address; and
perform a to-be-processed task based on a virtual storage address of the first data to obtain a first processing result, wherein performing the to-be-processed task comprises performing an $(i+1)^{th}$ operation based on a second processing result of an $i^{th}$ operation in the N consecutive operations to obtain a third processing result of the $(i+1)^{th}$ operation, wherein i is an integer, wherein $1 \leq i \leq N-1$, and wherein a fourth processing result of an $N^{th}$ operation is the first processing result.

2. The system of claim 1, wherein the memory is further configured to store the second processing result.

3. The system of claim 1, wherein the host device is further configured to:
obtain proxy information comprising the virtual storage address; and
generate the invocation information based on the proxy information.

4. The system of claim 3, wherein the host device is further configured to store the proxy information.

5. The system of claim 1, wherein the memory is further configured to further store the first data is in a memory object, and wherein the memory object is a storage space of a segment of physical addresses from the memory.

6. The system of claim 3, wherein the acceleration device is further configured to send the virtual storage address to the host device, and wherein the host device is further configured to receive the virtual storage address from the acceleration device.

7. A method comprising:
receiving invocation information from a host device, wherein the invocation information indicates a storage address of first data for a to-be-processed service, wherein the to-be-processed service comprises N consecutive operations, and wherein N is an integer greater than 1;
obtaining the first data from a memory based on the storage address; and
performing a to-be-processed task based on a virtual storage address of the first data to obtain a first processing result, wherein performing the to-be-processed task comprises performing an $(i+1)^{th}$ operation based on a second processing result of an $i^{th}$ operation in the N consecutive operations to obtain a third processing result of the $(i+1)^{th}$ operation, wherein i is an integer, wherein $1 \leq i \leq N-1$, and wherein a fourth processing result of an $N^{th}$ operation is the first processing result.

8. The method of claim 7, further comprising storing the second processing result of the $i^{th}$ operation in the acceleration device.

9. The method of claim 7, wherein the first data is in a memory object, and wherein the memory object is a storage space of a segment of physical addresses from the memory.

10. The method of claim 7, further comprising sending a virtual storage address to the host device.

11. An apparatus configured to couple in an acceleration device and comprising:
a communication interface configured to receive invocation information from a host device, wherein the invocation information indicates a storage address of first data for a to-be-processed service, service, wherein the to-be-processed service comprises N consecutive operations, wherein N is an integer greater than 1, and wherein the acceleration device is in a communication connection with the host device and coupled to a memory that stores the first data; and
one or more processors coupled to the communication interface and configured to:
obtain the first data from the memory based on the storage address; and
perform a to-be-processed task based on a virtual storage address of the first data to obtain a first processing result, wherein performing the to-be-processed task comprises performing an $(i+1)^{th}$ operation based on a second processing result of an $i^{th}$ operation in the N consecutive operations to obtain a third processing result of the $(i+1)^{th}$ operation, wherein i is an integer, wherein $1 \leq i \leq N-1$, and wherein a fourth processing result of an $N^{th}$ operation is the first processing result.

12. The apparatus of claim 11, wherein the one or more processors are further configured to store the second processing result in the memory or the acceleration device.

13. The apparatus of claim 11, wherein the first data is in a memory object, and wherein the memory object is a storage space of a segment of physical addresses from the memory.

14. The apparatus of claim 11, wherein the communication interface is further configured to send the virtual storage address of the first data to the host device.

15. A computer program product comprising computer-executable instructions that are stored on a non-transitory computer readable medium and that, when executed by one or more processors, cause an acceleration device to:

receive invocation information from a host device, wherein the invocation information indicates a storage address of first data for a to-be-processed service, wherein the to-be-processed service comprises N consecutive operations, and wherein N is an integer greater than 1;

obtain the first data from a memory based on the storage address; and perform a to-be-processed task based on a virtual storage address of the first data to obtain a first processing result, wherein performing the to-be-processed task comprises performing an $(i+1)^{th}$ operation based on a second processing result of an $i^{th}$ operation in the N consecutive operations to obtain a third processing result of the $(i+1)^{th}$ operation, wherein i is an integer, wherein $1 \leq i \leq N-1$, and wherein a fourth processing result of an $N^{th}$ operation is the first processing result.

16. The computer program product of claim 15, wherein the first data is in a memory object, and wherein the memory object is a storage space of a segment of physical addresses from a memory coupled to the acceleration device.

17. The computer program product of claim 15, wherein the one or more processors is further configured to send the virtual storage address to the host device.

18. The computer program product of claim 15, wherein the invocation information is based on proxy information comprising the virtual storage address.

19. The computer program product of claim 15, wherein the one or more processors is further configured to store the second processing result.

20. The computer program product of claim 15, wherein the one or more processors is further configured to obtain the first data from a memory object of the memory, wherein the memory object is a storage space of a segment of physical addresses of the memory.

* * * * *